US008954313B2

(12) United States Patent
Nazarian et al.

(10) Patent No.: US 8,954,313 B2
(45) Date of Patent: Feb. 10, 2015

(54) MEDIA CONTENT PRESENTATION IN A SELECTED LANGUAGE

(71) Applicant: Disney Enterprises, Inc., Burbank, CA (US)

(72) Inventors: Artin Nazarian, Glendale, CA (US); Greg Head, Los Angeles, CA (US); Paul Marz, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 204 days.

(21) Appl. No.: 13/711,546

(22) Filed: Dec. 11, 2012

(65) Prior Publication Data

US 2014/0163949 A1    Jun. 12, 2014

(51) Int. Cl.
*G06F 17/28* (2006.01)
*H04N 21/432* (2011.01)
*H04N 21/462* (2011.01)
*H04N 21/81* (2011.01)

(52) U.S. Cl.
CPC ............ *G06F 17/289* (2013.01); *H04N 21/432* (2013.01); *H04N 21/4622* (2013.01); *H04N 21/8106* (2013.01)

USPC ............................................................. 704/2

(58) Field of Classification Search
USPC .............................................................. 704/2
See application file for complete search history.

(56) References Cited

U.S. PATENT DOCUMENTS 7,108,171 B1 *  9/2006  Ergo et al. ................. 235/375
8,635,058 B2 *  1/2014  Patel ............................ 704/2

* cited by examiner

*Primary Examiner* — Susan McFadden
(74) *Attorney, Agent, or Firm* — Farjami & Farjami LLP

(57) ABSTRACT

There is provided a method and system for providing a media content in a selected language. The method comprises receiving a first input selecting a language, receiving at least one available media content from a media content server, receiving a second input selecting the media content for display from the at least one available media content, transmitting the first input and the second input to a language management server, receiving a language content corresponding to the media content from the language management server, and processing the media content with the language content. The processing of the media content may include synchronizing the language content to the media content. The language content may correspond to subtitles of the media content or audio dubbing of the media content in the selected language.

12 Claims, 6 Drawing Sheets

Fig. 3E

```
                    Media Device 310
┌───────────────────────────────────────────────┐
│           Application Window 352e             │
│ Profile Page 356                              │
│                          Language 326         │
│                          Spanish – Selected   │
│    Full Name  [        ] Italian              │
│                          French               │
│    E-Mail     [        ]                      │
│                                               │
│    User Name  [        ]                      │
│                                               │
│    Password   [        ]                      │
│                                               │
└───────────────────────────────────────────────┘
```

MEDIA CONTENT PRESENTATION IN A SELECTED LANGUAGE

BACKGROUND

Currently, broadcast and cable networks deliver television programs, movies, and other media content to consumers through applications and services that allow the consumers to choose the media content they wish to view. These applications and services give consumers flexibility in watching their favorite shows. Consumers can choose a time and a place where they can comfortably view a program. Thus, these applications and services have become the favored choice for media content consumption by the public.

Smart televisions and other user devices are capable of running applications that give the user flexibility to schedule a particular show for recording, set user preference for playback, save user information, or a variety of other features. These applications are also capable of identifying and splitting audio/video tracks on media content in order to present a variety of playback options. However, these applications running on user devices are often limited to one or two languages when presenting the media content for playback. This occurs because broadcast and cable networks take several months to provide subtitles or audio dubbing of media content. Thus, non-native speakers are prevented from watching new media content in their native language, which can impede the distribution of new media content in different countries.

SUMMARY

The present disclosure is directed a media content presentation in a selected language, substantially as shown in and/or described in connection with at least one of the figures, as set forth more completely in the claims.

BRIEF DESCRIPTION OF THE DRAWINGS

FIG. 3E presents a media device with a user interface for selecting user preferences;

DETAILED DESCRIPTION

Figure 1:
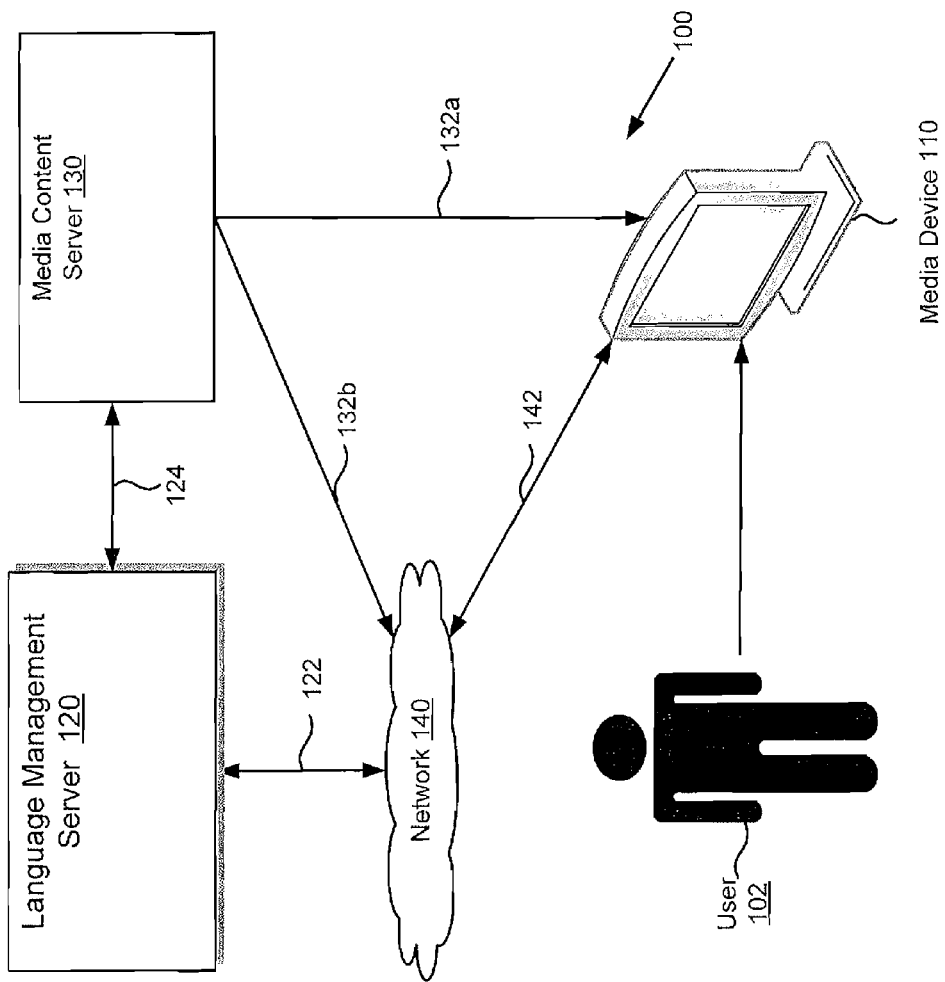
FIG. 1 presents a diagram of an exemplary system for presenting media content in a selected language.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a diagram of an exemplary system for presenting media content in a selected language. As shown in FIG. 1, system environment 100 includes media device 110 connected to communications network 140 and configured to receive media content from media content server 130. Media device 110 also receives language content from language management server 120 over communications network 140. Also shown in FIG. 1 is user 102 providing input to media device 110 and viewing content on media device 110.

According to the implementation of FIG. 1, media content server 130 may provide media content directly to media device 110, as in the case of connection 132a, or may provide media content to communications network 140 over connection 132b, where media device 110 can access and receive media content and language content over connection 142. Media content server 130 may be a broadcast or cable television network, providing media content, such as audio-visual or video content. More generally, as more media content become available, media content server 130 may be any producer of media content, such as a user generated content provider or new source provider, for example. While media content server 130 is shown as one media content server, it is understood that media content server 130 may correspond to one media content server or a plurality of media content servers, such as a cable television provider with a plurality of television networks available. As shown in FIG. 1, media content server 130 may utilize communications network 140 to provide media content over connection 132b and 142 to media device 110, or may otherwise provide content to media device 110, such as through connection 132a such as a broadcast, cable, or satellite connection.

Also shown in FIG. 1 is language management server 120 connected to network 140 over connection 122. Language management server 120 is also connected to media content server 130 through connection 124. Language management server 120 may receive media content or information concerning media content from media content server 130 over connection 124. This information may be sufficient for language management server 120 to create language content that may include some audio, visual, or audiovisual content sufficient to translate the native language of the media content provided by media content server 130, to a different language understood by user 102. This may be a dubbing track, subtitles, or both. Language management server 120 may also receive the language content from media content server 130, where media content server 130 has created the language content and is providing the language content to language management server 120 for distribution. As previously noted, according to FIG. 1, language management server 120 is connected to network 140 over connection 122. Language management server is then further connected and accessible to media device 110.

User 102 may utilize media device 110 to watch media content from media content server 130. Although FIG. 1 shows user 102 and media device 110 as one user and media device, it is understood that user 102 and media device 110 may correspond to a plurality of media devices and users, such as a regional area of available media devices and target audience, or even all available media devices connectable to language management server 120 and media content server 130. Further, user 102 may wish to view or listen to media content in a different language than originally broadcasted by media content server 130. As will be explained in more detail later, user 102 may set or select a language using an application with media device 110. In such an implementation, media device 110 may be running the application, allowing user 102 to select a desired language. When this occurs, the application of media device 110 may send a request for a language content corresponding to the media content user 102 wishes to display. Thus, language management server 120 may provide language content, such as a dubbing track or subtitles, to network 140 for media device 110 to access over connection 142. The application on media device 110 may then present media content received from media content server 130 with language content from language management server 120 so that user 102 may view media content in a selected language.

Figure 2:
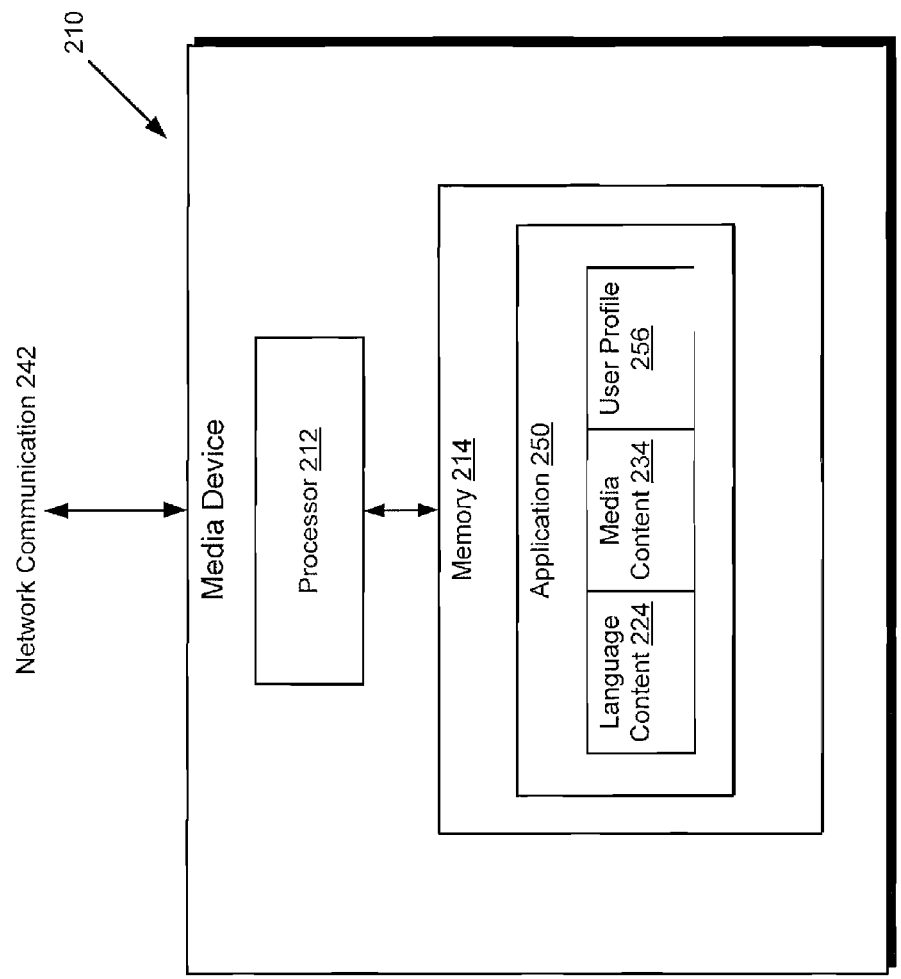
FIG. 2 presents a media device containing an application for presenting media content in a selected language.

According to FIG. 2, FIG. 2 presents a media device containing an application for presenting media content in a selected language. As shown in FIG. 2, media device 210 includes processor 212 and memory 214. Also shown in FIG. 2 is application 250 stored in memory 214 with language content 224, media content 234, and user profile 256. Media device 210 is also connected to network communication 242. Application 250 is shown as utilizing language content 224, media content 234, and user profile 256 stored in memory 214. Application 250 may access and use each of language content 224, media content 234, and user profile 256 as will be explained below in order to present media content 234 in a selected language using language content 224. It is noted that processor 212 may refer to a hardware processor, such as a microprocessor, or more generally to a processor capable of running application 250.

Media device 210 of FIG. 2 is connected to network communication 242 in order to receive data, such as application 250, language content 224, and media content 234 stored in memory 214. For example, network communication 242 may be connection 142 to network 140 of FIG. 1 in order to receive language content 224 and media content 234. Network communication 242 may also be connection 132a to media content server 130 of FIG. 1 to receive media content 234.

As further shown in FIG. 2, processor 212 of media device 210 may access memory 214 and run application 250. For example, application 250 may be a device application included with media device 210 or may be downloadable over network communications 242. In either implementation, application 250 may be a device application capable of displaying media content 234. Further, application 250 may also be capable of using language content 224 with media content 234 to affect output of media content 234 so that language content 224 is output with media content 234. In addition, application 250 also contains user profile 256 stored in memory 214 in order to determine language content 224 and media content 234 to retrieve over network communications 242. These features of application 250 will be explained further in reference to FIGS. 3A-E.

Figure 3A:
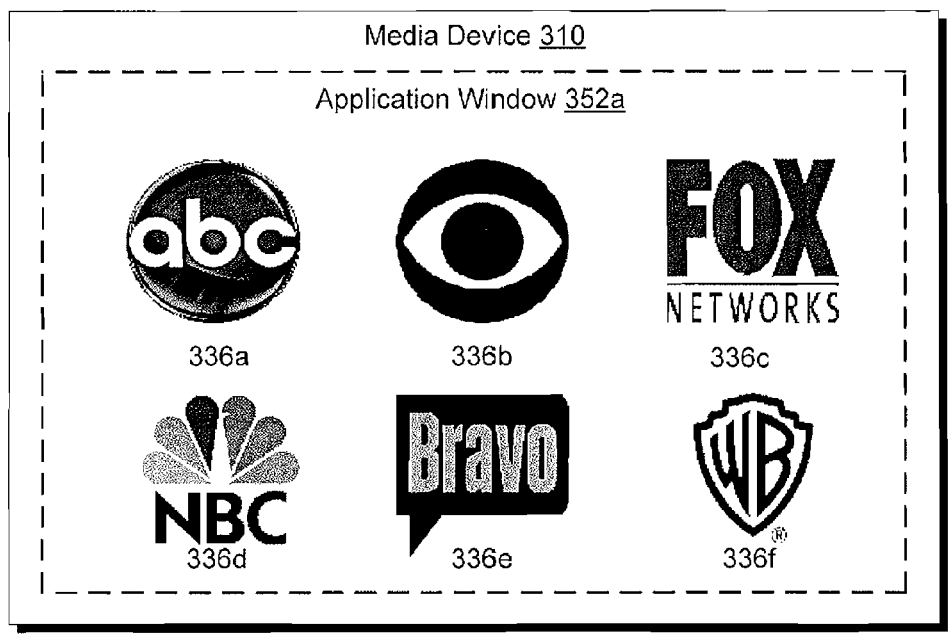
FIG. 3A shows an exemplary media device running an application for selection of media content.

Turning now to FIG. 3A, FIG. 3A shows an exemplary media device running an application for selection of media content. As shown in FIG. 3A, media device 310a is running an application, such as application 250 of FIG. 2, displaying application window 352a, which allows for selection of media content channel 336a, 336b, 336c, 336d, 336e, and 336f. Media content channels 336a-f may correspond to a selectable channel from a media content server, such as media content server 130 of FIG. 1, that provides media content. Thus, each media content channel 336a-f may correspond to a different media content server, which provides media content to media device 310, or a media content server that provides a plurality of media content channels.

As previously discussed, the application, such as application 250 of FIG. 2, may come stored on media device 310, or may be downloadable over a network, such as network 140, or otherwise loaded onto media device 310. When the user, such as user 102 of FIG. 1, of media device 310 turns on or utilizes media device 310, the application may execute to view application window 352a. The application may begin running at start-up of media device 310 or the application may have to be executed by the user.

Application window 352a allows the user to select a media content channel, such as media content channels 336a-f. As shown in FIG. 3A, several media content channels are displayed by their respective trademark or brand symbol. Thus, the user may recognize the trademark or brand symbol of the media content channel through visual cues. The visual cues used to represent media content channels 336a-f may come in many different intuitive forms. The user may select one of the media content channels 336a-f corresponding to the media content the user wishes to view.

Media content channels 336a-f may be presented in application window 352a through past user selection of media content channels 336a-f, such as tracking the user's favorite or most visited channels. Media content channels 336a-f may also be presented in application window 352a by selecting the media content channels from media content servers with the most available media content or the most popular media content. The media content servers may also pay or otherwise subscribe to a server to have their media content channel 336a-f shown in application window 352a or more prominently displayed in application window 352a. Furthermore, the application displaying application window 352a may also choose to display media content channels 336a-f in application window 352a depending on whether language content is available for the media content, or the amount of language content available.

Figure 3B:
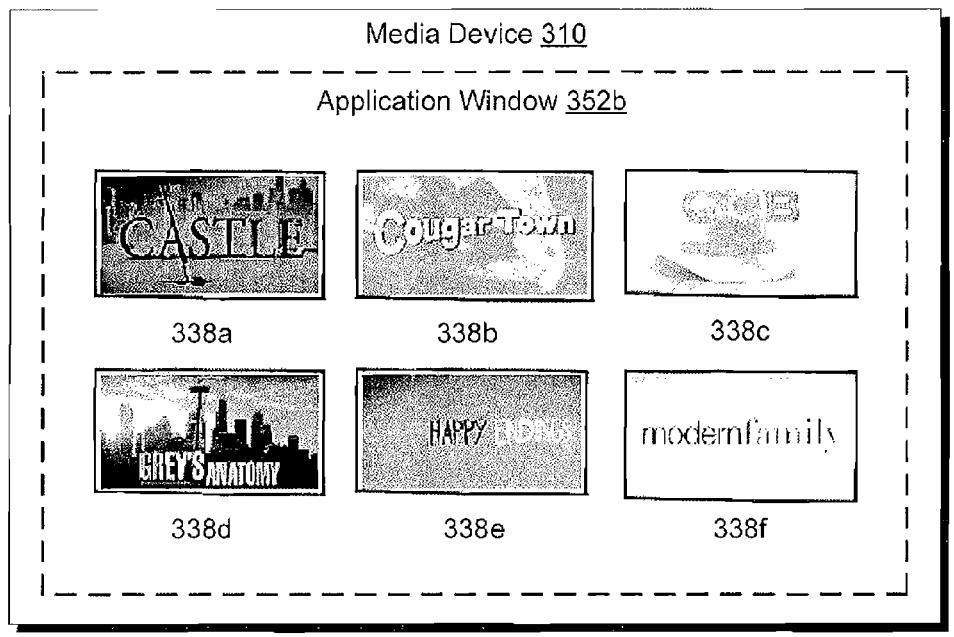
FIG. 3B shows another exemplary media device application with a viewing pane of available media content for selection.

Moving to FIG. 3B, FIG. 3B shows another exemplary media device application with a viewing pane of available media content for selection. According to FIG. 3B, media device 310 running an application, such as application 250 of FIG. 2, displays application window 352b to a user, such as user 102 of FIG. 1. Application window 352b is shown with available media content 338a, 338b, 338c, 338d, 338e, and 338f for selection by the user. Available media content 338a-f may correspond to selectable media content being received from a media content server, such as media content server 130 of FIG. 1. Thus, each available media content 338a-f may correspond to different media content available for viewing from the media content servers.

As previously discussed, the application may be running on media device 310 in order to show application window 352b. Application window 352b may appear after selection of one of media content channels 336a-f in application window 352a of FIG. 3A. Thus, after the user selects one of the media content channels, the user may view available media content 338a-f in application window 352b. Available media content 338a-f may be chosen for display in application window 352b based on available media content, or media content having available language content. Available media content 338a-f may also be presented in application window 352b based on past viewing history of the user.

In another implementation, application window 352b may appear immediately on execution of the application. In such an implementation, the application may choose available media contents 338a-f to display in application window 352b based on a viewing history of the user. In other implementations, available media content 338a-f may be chosen for display based on a preselected schedule or recording information provided by the user. Thus, in each of these implementations, the user is able to see available media content 338*a-f* available to be viewed on media device 310. Once the user has selected an available media content 338*a-f* for viewing, the user may be presented with FIG. 3C.

Figure 3C:
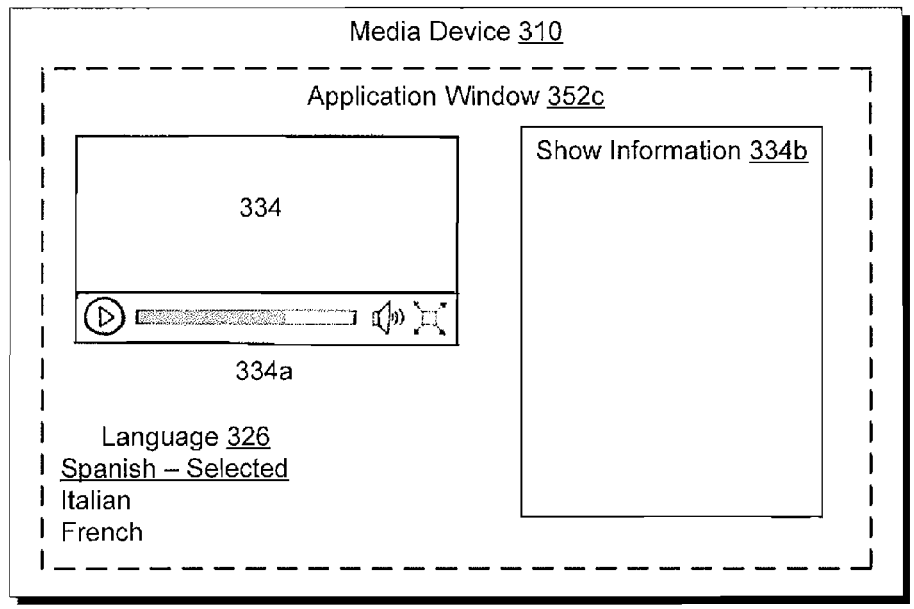
FIG. 3C shows a media device running an application for presenting selected media content in a selected language.

According to FIG. 3C, FIG. 3C shows a media device running an application for presenting selected media content in a selected language. As viewed in FIG. 3C, media device 310 running an application, such as application 250 of FIG. 2, displays application window 352*c* to a user, such as user 102 of FIG. 1. As shown in FIG. 3C, application window 352*c* includes language 326, media content 334, media display window 334*a*, and show information 334*b*. Media content 334 may correspond to the selected media content from available media contents 338*a-f* of FIG. 3B. Media content 334 may be presented in media display window 334*a*. Language 326 may correspond to a selectable language available for media content 334. The available set of language for language 326 may correspond to the available language contents from a language management server, such as language management server 120 of FIG. 1. Thus, depending on the available language contents that can be received by media device 310, language 326 may display different selectable languages.

Once the user has selected the media content, such as through selection in application window 352*b* of FIG. 3B, media content 334 may display in media display window 334*a*. Media display window 334*a* may correspond to a preview area where only a preview part of media content 334 is displayed until further action by the user, or media display window 334*a* may begin displaying the entirety of media content 334. As previously discussed, the user is further given the choice to select language 326. Language 326 corresponds to the available language content. Once the user selects language 326, media device 310 receives the language content as previously discussed. This allows the application running on media device 310 and displaying application window 352*c* to use the language content in conjunction with media content 334 to provide media content 334 in a different language than the original language of media content 334.

The application running on media device 310 processes media content 334 with the language content corresponding to language 326. This may correspond to the application synchronizing subtitles of the selected language or synchronizing a dubbing track of the selected language with media content 334. The application may perform this synchronization based on the audio track of media content 334, the video of media content 334, or a digital fingerprint. Further, the application may receive instructions, such as synchronization data, from the language management server. For example, additional data may be added to language content to instruct the application with how to synchronize the language content to the media content.

Once synchronization is complete, media content 334 in language 326 is available for viewing. Media content 334 in language 326 may begin playing immediately. As previously discussed, media content 334 in language 326 may also display in media display window 334*a*, where the user can view the media content along with other options, such as a full screen mode, volume control, playback definition, or other playback control. Additionally, the user may be required to perform an additional input, such as selecting a preview of the media content in media display window 334*a*, in order to enter the full playback mode.

Additionally, application window 352*c* contains show information 334*b*. Show information 334*b* may include a field where information pertaining to the show is located. This may be a brief show synopsis or other information such as actors, directors, or other creators of the media content. Additionally, show information 334*b* may include scheduling information concerning the media content. This may allow the user to select the scheduling information and create a recording schedule for the media content as will be explained further in reference to FIG. 3D. Further, show information 334*b* may also be translated by language content so that it appears in language 326. Information for translating show information 334*b*, or the show information 334*b* in language 326 may be provided in the language content.

Figure 3D:
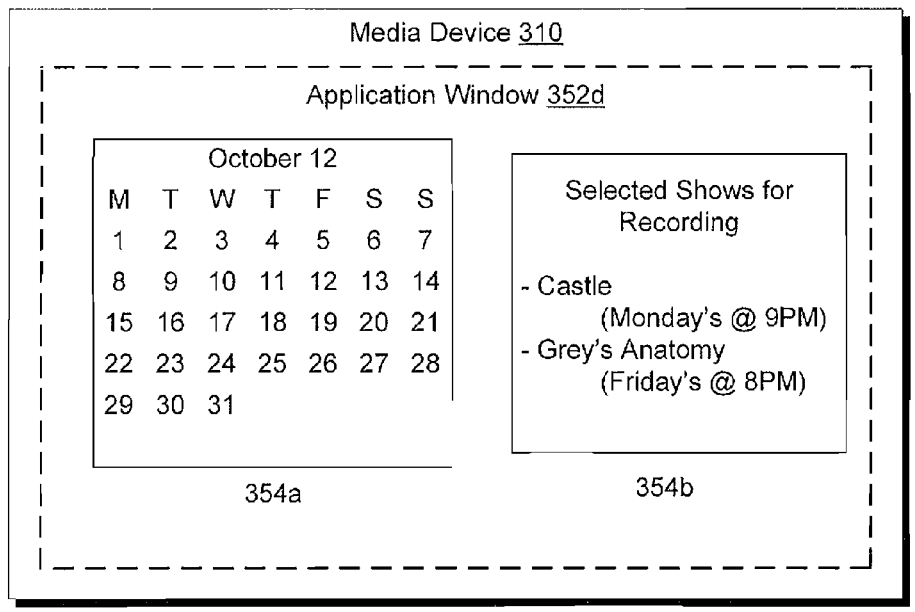
FIG. 3D presents a media device running a user interface for scheduling selection of media content.

Moving to FIG. 3D, FIG. 3D presents a media device running a user interface for scheduling selection of media content. FIG. 3D contains media device 310 displaying application window 352*d* containing scheduling calender 354*a* and scheduled shows 354*b*. Application window 352*d* may appear after selection of an appropriate menu choice in show information 334*b* of FIG. 3C by a user, such as user 102 of FIG. 1. The user of media device 310 may also navigate to application window 352*d* through other menu option. For example, an application, such as application 250 of FIG. 2, running on media device 310 may present start-up menus or other selectable menus during execution. Further, a remote device of the user may include buttons, such as a menu or schedule button, that instructs the application to display application window 352*d*.

The user of media device 310 may view and record available media content by scheduling calender 354*a*. Thus, by selecting a day and/or time, the user may set media content to record. The media content set to record may be displayed in scheduled shows 354*b*. As can be seen in FIG. 3D, the user has scheduled 2 shows to record. By setting these two shows, the user has instructed the application to have an available service to record the show. This may be an inherent feature of media device 310, the application running on media device 310, a service provider of cable/satellite/internet, or an attached device. Regardless of the provider of such a feature, application window 352*d* will show scheduled media content in scheduled shows 354*b*.

Application window 352*d* also provides the application with the necessary information to access and receive language content corresponding to the schedule media content in scheduled shows 354*b*. Once the user has decided to record a media content and placed it in scheduled shows 354*b*, the application displaying application window 352*d* may contact a language management server, such as language management server 120 of FIG. 1, to either request a language content matching the media content, or schedule to receive the language content when available, in the case where the media content is not yet available. Thus, when the user decides to watch the media content scheduled in scheduled shows 354*b*, language content will be available for the media player to utilize with playback of the media content.

As shown in FIG. 3E, FIG. 3E presents a media device with a user interface for selecting user preferences. FIG. 3E shows media device 310 running an application, such as application 250, displaying application window 352*e*. According to FIG. 3E, application window 352*e* shows profile page 356 with information boxes and language 326 with selectable languages. A user of media device 310, such as user 102 of FIG. 1, may access application window 352*e* at initial execution or start-up of the application. This may be the case where the user has to set up an initial profile for use of the application. Thus, the user will enter the requested information in profile page 356, and select language 326. In such an implementation, the application will persistently store language 326.

As previously discussed, language 326 may display selectable languages based on regional, demographic, or geographic information, or the available language content. Once language 326 is selected, media device 310 is set to receive language content matching language 326 for media content. For example, in application window 352c of FIG. 3C, media content 334 with the language set in application window 352e with display, and language 326 will appear selected in Spanish.

FIGS. 1, 2, and 3A-E will now be further described by reference to FIG. 4, which presents flowchart 400 describing an exemplary flowchart illustrating a method for a media content presentation in a selected language. With respect to the method outlined in FIG. 4, it is noted that certain details and features have been left out of flowchart 400 in order not to obscure the discussion of the inventive features in the present application.

Figure 4:
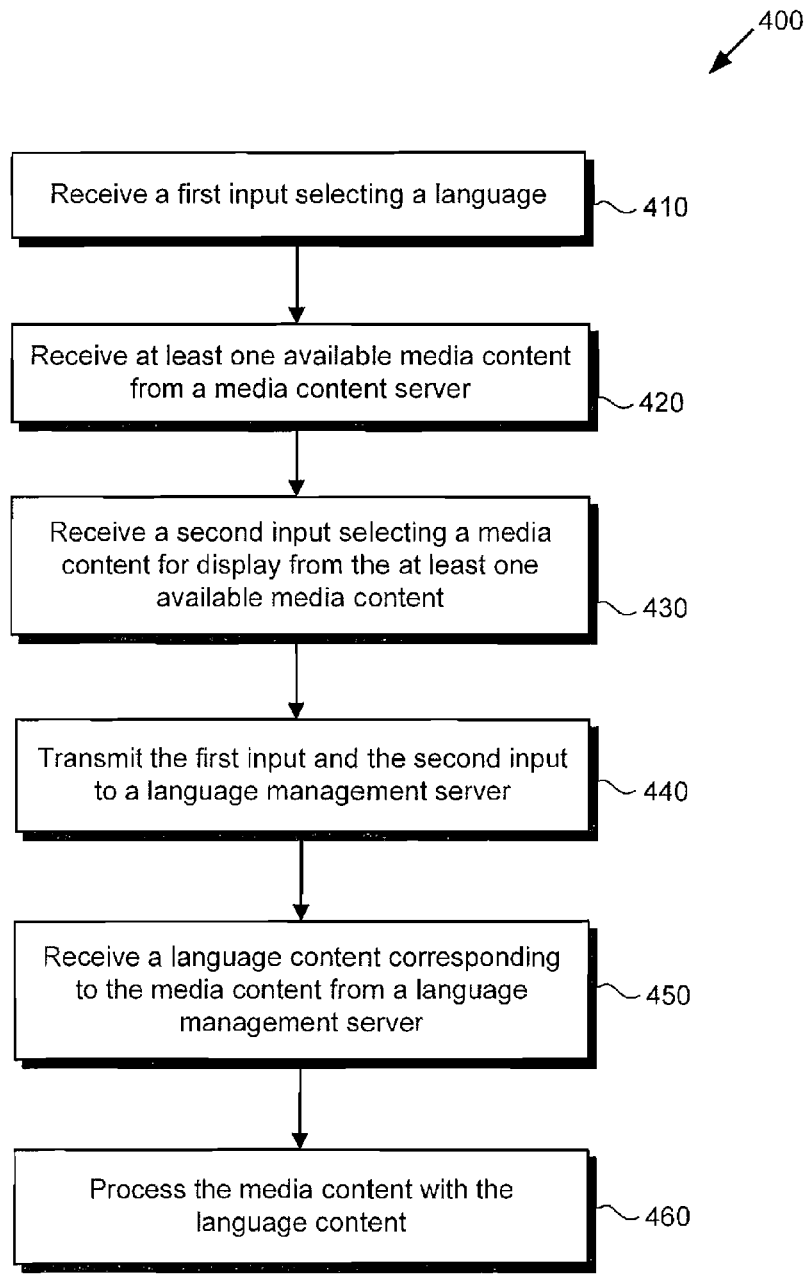
FIG. 4 presents an exemplary flowchart illustrating a method for presenting media content in a selected language.

Referring to FIG. 4 in combination with FIG. 1, FIG. 2, and FIG. 3A-E, flowchart 400 begins with receiving a first input selecting a language 326 (410). The receiving may be performed by processor 212 of media device 110/210/310 executing application 250, receiving a first input from user 102, such as selecting a language 326 from application window 352c/352e. As previously discussed, user 102 may input language 326 at application window 352c just prior to watching media content 334, such as in media display window 334a. In another implementation, user 102 may enter language 326 on profile page 356 so that it is persistently stored with application 250 and automatically chosen when viewing media content 334.

As previously discussed, the language available under language 326 may be dependent on the available language content 224 from language management server 120. However, in different implementation, language 326 may display languages based on regional preferences or other geographic or demographic concerns.

Flowchart 400 continues by receiving at least one available media content 338a-f from a media content server 130 (420). Processor 212 of media device 110/210/310 executing application 250 may perform the receiving at least one available media content 338a-f over network communication 242. As previously discussed, media device 110/210/310 may use connection 132a directly from media content server 130 to receive available media content 338a-f. For example, this may be used with broadcast or satellite television. In another implementation, media content server 130 may distribute available media content 338a-f over network 140, such as through connection 132b. In such an implementation, media device 110/210/310 may receive available media content 338a-f over connection 142 to network 140. Such an implementation may be used with internet media content resources, such as broadcast and cable network websites, television viewing websites, or user generated content websites. The method of flowchart 400 continues by receiving a second input selecting a media content 234/334 for display from the at least one available media content 338a-f (430). The receiving may be performed by processor 212 of media device 110/210/310 executing application 250, receiving a second input from user 102, such as selecting a media content 234/334 for display from the at least one available media content 338a-f. For example, user 102 may view application window 352a and select one of media content channels 336a-f. From there, user 102 may view available media content 338a-f in application window 352b. User 102 may then enter a second input selecting media content 234/334 for display from available media content 338a-f. Alternatively, user 102 may view application window 352b first with available media content 338a-f, and select media content 234/334 for display.

In another implementation, user 102 may access application window 352d with scheduling calender 354a and scheduled shows 354b. In such an implementation, user 102 may schedule media device 110/210/310 to select media content 234/334 from available media content 338a-f at a certain time and date, or to record media content 234/334 and retrieve corresponding language content 224. For example, user 102 has scheduled application 250 to select Castle on Monday at 9:00 PM. Thus, application 250 will select Castle on Monday at 9:00 PM as media content 234/334 for display. In another implementation, application 250 will instead record Castle and retrieve language content 224 corresponding to Castle for later viewing by user 102.

Flowchart 400 continues by transmitting the first input and the second input to a language management server 120 (440). The transmitting may be performed by processor 212 of media device 110/210/310 executing application 250. Processor 212 may execute application 250 and transmit the first and the second input to language management server 120 over network communication 242. As previously discussed, media device 110/210/310 may be connected to network 140 over connection 142. Media device 110/210/310 may then transmit the first input and the second input over network 140. Language management server 120 is connected to network 140 over connection 122, thus receives the first input and the second input from media device 110/210/310.

The first input and the second input contain sufficient information to identify language 326 and media content 234/334, respectively. Thus, language management server 120 will receive information corresponding to language 326 and media content 234/334. This information is sufficient for language management server 120 to determine language content 224 that matches media content 234/334. If media content 234/334 corresponds to Castle in the above example, and language 326 is selected as Spanish, language management server 120 can determine that language content 224 must correspond to Spanish and the show Castle.

Next, the method of flowchart 400 continues by receiving a language content 224 corresponding to the media content 234/334 from a language management server 120 (450). Processor 212 of media device 110/210/310 executing application 250 may perform the receiving. Processor 212 may receive language content 224 corresponding to media content 234/334 from language management server 120. Language management server 120 may make language content 224 corresponding to media content 234/334 available over network communications 242. For example, language management server 120 may be connected to network 140 over connection 122. Further, media device 110/210/310 may be connected to network 140 over connection 142. Thus, media device 110/210/310 may receive language content 224 from language management server 120 over network 140.

As previously discussed, language content 224 corresponds to media content 234/334. Language content may be created by language management server 120 or stored by language management server 120. In one implementation, language management server 120 receives media content 234/334 or sufficient information to create language content 224. Language management server 120 may receive this information directly from media content server 130, such as over connection 124, or over connection 122 to network 140. In this implementation, language management server then creates language content 224 for use with media content 234/334. However, in another implementation, media content server 130 may create language content 224 and provide language content 224 to language management server 120 for storage and distribution.

After receiving language content 224, application 250 may instruct processor 212 to store language content 224 in memory 214. Thus, language content 224 may be available for future use with application 250 on media content 234/334. Alternatively, application 250 on media device 110/210/310 may determine user 102 wishes to view media content 234/334 with language content 224 immediately and proceed as described below.

Flowchart 400 concludes with processing the media content 234/334 with the language content 224 (460). The processing may be performed by processor 212 device 110/210/310 executing application 250 to process media content 234/334 with language content 224. The processing may correspond to adding language content 224 with media content 234/334, such as overlaying subtitles in language content 224 onto media content 234/334. The processing may also correspond to synchronizing a dubbing track in language content 224 with media content 234/334.

Application 250 may process media content 234/334 with language content 224 using the audio or visual tracks of media content 234/334. Thus, in one implementation, application 250 is capable of identifying the audio or visual tracks of media content 234/334 and synchronizing language content 224 using the audio or visual track. In another implementation, a digital fingerprint may be associated with media content 234/334. Thus, application 250 may use the digital fingerprint to properly process language content 224 with media content 234/334.

When processing language content 224 with media content 234/334, application may suppress the audio track of media content 234/334, such as when language content 224 corresponds to a dubbing track for media content 234/334. In this implementation, application 250 may either receive information from language management server 120 concerning the proper audio track to suppress, or may be capable of identifying the proper audio track and suppressing it.

In another implementation, language content 224 corresponds to subtitles used for media content 234/334. Thus, application 250 may either receive instructions to properly synchronize the subtitles to media content 234/334 or may be capable of identifying the proper time and place to insert subtitles from media content 234/334 from the audio or visual tracks.

In this manner, a media content presentation may be quickly tailored for a selected language by a user. This allows media content to have better distribution by giving non-native speakers customization and access to media content they would not otherwise have.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system having a memory and a processor, the method comprising:
   receiving, using the processor, a first input selecting a language;
   receiving, using the processor, at least one available video content including a first video content from a media content server;
   receiving, using the processor, a second input selecting the first video content from the at least one available video content received from the media content server;
   transmitting, using the processor, the first input and the second input to a language management server;
   receiving, using the processor, a language audio content corresponding to the first video content from the language management server;
   storing, using the processor, the language audio content in the memory; and
   displaying, using the processor, the first video content on a display in synchronization with playing the language audio content from the memory.

2. The method of claim 1 wherein the language audio content comprises subtitles corresponding to an audio content of the first video content.

3. The method of claim 2 wherein the language audio content comprises audio dubbing corresponding to an audio content of the first video content.

4. The method of claim 1, wherein the synchronization uses one of a broadcast audio signal, a broadcast video signal, and a digital fingerprint.

5. The method of claim 1, wherein prior to the receiving the second user input selecting the first video content, the method further comprises displaying a viewing pane of the at least one available video content for selection.

6. The method of claim 1, wherein the second user input comprises a scheduling calendar programmable by a user.

7. A media device comprising:
   a processor; and
   a memory;
   the processor is configured to:
      receive a first input selecting a language;
      receive at least one available video content including a first video content from a media content server;
      receive a second input selecting the first video content from the at least one available video content received from the media content server;
      transmit the first input and the second input to a language management server;
      receive a language audio content corresponding to the first video content from the language management server;
      store the language audio content in the memory; and
      display the first video content on a display in synchronization with playing the language audio content from the memory.

8. The media device of claim 7, wherein the synchronization uses one of a broadcast audio signal, a broadcast video signal, and a digital fingerprint.

9. The media device of claim 7, wherein prior to reception of the second user input selecting first video content, the processor is further configured to display a viewing pane of the at least one available video content on the display.

10. The media device of claim 7, wherein the second user input comprises a scheduling calendar programmable by a user.

11. The media device of claim 7, wherein the language audio content comprises subtitles corresponding to an audio content of the first video content.

12. The media device of claim 7, wherein the language audio content comprises audio dubbing corresponding to an audio content of the first video content.

* * * * *